June 27, 1967 M. MERZ 3,327,741
ADJUSTABLE CHAIN SAW BAR
Filed Oct. 13, 1965

Inventor:
Max Merz
By: Evan D. Roberts Atty.

United States Patent Office 3,327,741
Patented June 27, 1967

3,327,741
ADJUSTABLE CHAIN SAW BAR
Max Merz, Los Angeles, Calif., assignor, by mesne assignments, to Nicholson File Company, East Providence, R.I., a corporation of Rhode Island
Filed Oct. 13, 1965, Ser. No. 495,501
5 Claims. (Cl. 143—32)

This invention relates to an improved chain saw structure, and in particular, to a chain saw structure having a bar which is angularly and linearly adjustable with respect to the axis of the drive sprocket of the structure.

It is a common practice in the existing chain saw art to provide longitudinally extending slots in the bar of the chain saw to allow the bar to be longitudinally and linearly adjustably mounted with respect to the chain driving sprocket driven by the drive unit. However, in this situation, this linear longitudinal adjustment is effective for taking up slack that may develop in the chain, but does not have an appropriate means for providing angular adjustment of the bar with respect to the sprocket.

An angular adjustment is also important so that the bar can be adjusted to guide the chain from the bar to the sprocket and to receive the chain from the sprocket in such a manner as to minimize the effects of the impact of the chain on the bar independently of the linear adjusted position of the bar with respect to the sprocket. Known types of chain saw bars having the linear adjustment or an angular adjustment do not provide a satisfactory combination of these adjustments and particularly do not provide this combination in a bar that is reversible to the extent that the bar can be reversibly mounted from top to bottom on the unit to distribute the wear on the bar more evenly. In addition, the presently known types of chain saw structures do not provide a versatile adjustment facility with any acceptable degree of accuracy, reliability or stability.

It is, therefore, highly desirable to provide a chain saw bar structure wherein the bar is so adjustably mounted to the drive unit of the saw, that it has the facility of being longitudinally adjustable with respect to the sprocket driven by the drive unit, angularly adjustable with respect to the axis of the sprocket, and adapted to be reversibly mounted with the top and bottom thereof in interchanged position to respectively facilitate taking up of elongation of the chain to minimize the effects of the impact of the chain with respect to the sprocket and bar, and to more evenly distribute the wear on the bar.

A primary object of this invention is, therefore, to provide an improved chain saw bar which is adjustably linearly securable to the drive unit, and which is angularly adjustable with respect to the sprocket to minimize the impact of the chain on the sprocket and the bar independently of the linear adjustment.

It is a further object of this invention to provide an improved chain saw bar which is adjustably linearly securable to the drive unit, and which is angularly adjustable with respect to the sprocket to provide a versatile, highly reliable, accurate and reversible mounting relationship between the bar and the drive unit.

It is a still further object of this invention to provide a chain saw bar having the standard mounting slot which can be utilized in variations of mounting applications.

Another object of this invention is to provide an m-proved chain saw bar which is highly reliable and relatively simple and inexpensive to manufacture and maintain.

With these and other objects in view, the present invention provides an improved chain saw structure, wherein the bar thereof is provided with a standard aperture therein adjacent the driving sprocket of the chain saw and is fuurther provided with a mounting key in the aperture whereby the bar is adjustable linearly, angularly and reversibly with respect to the chain driving sprocket of the chain saw.

Other objects, advantages and novel aspects of the invention will become apparent upon consideration of the following detailed description, in conjunction with the accompanying drawing wherein.

Figure 1:
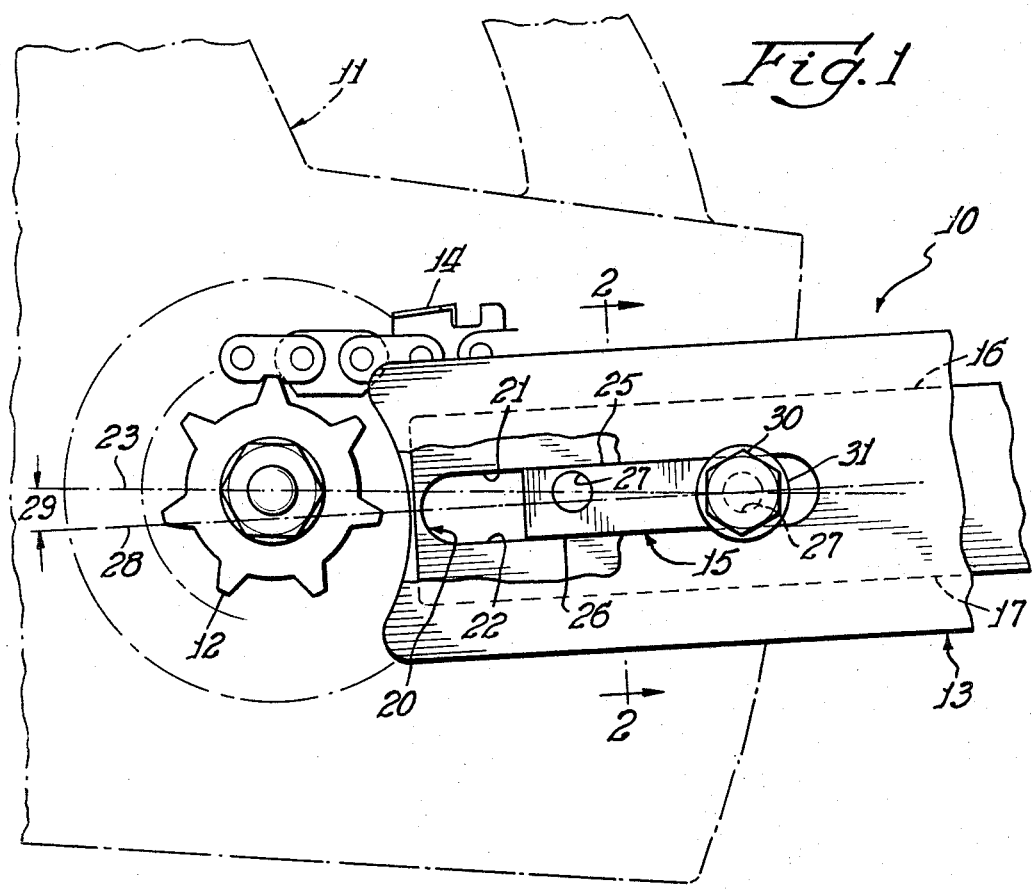
FIG. 1 is a partial side view of the chain saw bar of this invention showing a bar secured to the driving unit.
Figure 2:
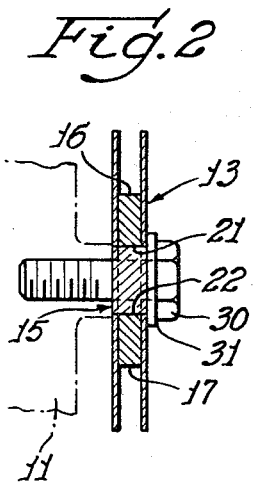
FIG. 2 is a vertical sectional view taken along line 2—2 of FIG. 1 showing the bar mounting key in position.
Figure 3:
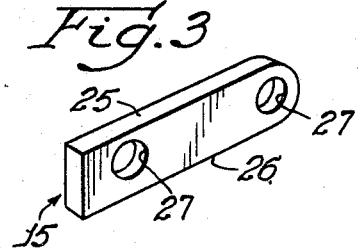
FIG. 3 is a perspective view of the bar mounting key.

Referring to the drawings, there is illustrated a chain saw structure generally designated by the numeral 10, which is provided generally with a drive unit 11, drive sprocket 12, bar 13, saw chain 14, and mounting key 15. The sprocket 12 is driven by the drive unit 11 and is adapted to operatively engage the chain 14 to drive the chain along upper and lower grooves 16 and 17 in the chain saw bar 13. The bar 13 is provided with an elongated longitudinal aperture 20 therethrough in the end thereof adjacent the sprocket 12 having upper and lower surfaces 21 and 22 centered on an aperture index line 23 which may be a centerline for the bar 13.

The mounting key 15 is slidably positioned in the longitudinal aperture 20 with longitudinally extending upper and lower surfaces 25 and 26 in respective engagement with the upper and lower surfaces 21 and 22 of the bar aperture 20. The key 15 is provided with circular apertures 27 that extend laterally therethrough which have the centers thereof positioned on a line 28 which defines an angle 29 with the aperture centerline. Screws 30 having heads 31 are inserted through washers 32 which have a diameter substantially larger than the width of the bar aperture 20. The screws 30 are positioned through the key apertures 27 of the key 15 and are threadably secured into the chain saw bar driving unit 11 to retain the bar 13 on the mounting key 15 and are secured to the drive unit 11.

It should be noted that the sliding relationship between the upper and lower surfaces 21 and 22 of the bar aperture 20 and the longitudinal upper and lower surfaces 25 and 26 of the mounting key 15 provide a linear adjustment relationship between the bar 13 and the key 15 and consequently, a linear adjustment relationship between the bar 13 and the sprocket 12.

In conjunction with the linear adjustment relationship, it should also be noted that the bar 13 is independently angularly positionable with respect to the sprocket 12 and to a degree determined by the angle 29 between the key aperture line 28 and the center line 23 of the bar aperture 20. This angular adjustment can be reversed to reverse the angular relationship between the bar 20 and the sprocket 12 by placing the key 15 in the bar aperture 20 in the reversed position with the lower surface 26 of the key in engagement with the upper surface 21 of the aperture 20, and the upper surface 25 of the key in engagement with the lower surface 22 of the slot 20.

It is important to note that the mounting key provides a ready means of angular adjustment of the bar with respect to the sprocket by selectively utilizing mounting keys having respective apertures on a line 28, with predetermined respectively different angular relationships between this line 28 and the bar aperture centerline 23.

Also, the present invention provides the mounting key 15 by which the chain saw bar is positioned and is angularly retained with respect to the sprocket 12, along extended upper and lower surfaces 25 and 26 thereof which are in complemental relationship with comparable surfaces 21 and 22 of the aperture 20 of the bar 13, so that the bar 13 is provided with ample support against angular rotation with respect to the drive unit 11 and sprocket 12, and thus reliably and adequately retained.

In addition, it should be noted that the chain saw bar 13 can be provided with a standard or common lateral aperture 20, to receive any number of mounting keys 15 providing predetermined angular relationships between the saw bar 13 and the sprocket 12 so that a standard bar 13 can be angularly positioned in any number of angular relationships with the sprocket 12 corresponding to the number of different mounting keys 15.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. An improved chain saw structure having a sprocket in operative driving engagement with a saw chain and driven by a drive unit comprising a bar having a groove in the periphery thereof for receiving the saw chain driven by the sprocket, said bar having an elongated lateral aperture therethrough adjacent the sprocket and having an index line, a mounting key adustably and slidably positioned in the aperture in the bar and having lateral apertures therethrough centered on a line defining a predetermined angle with respect to the index line of the aperture in said bar, and means for retaining said bar on said key and said key on said unit whereby the key will angularly position the bar with respect to the axis of the sprocket according to the predetermined angle between the key aperture line and the bar aperture index line.

2. An improved chain saw structure as defined in claim 1 wherein said mounting key has elongated sides in complemental respective engagement with the sides of the elongated bar aperture.

3. An improved chain saw structure as defined in claim 1 wherein said retaining means comprises a threaded clamping member passed through the key apertures and threaded into said unit.

4. An improved chain saw structure as defined in claim 1 wherein said retaining means comprises a pair of screws respectively passed through the key apertures, threaded into the unit, and having a portion substantially larger than the width of the aperture in said bar adjacent the side of the bar opposite the unit.

5. An improved chain saw structure as defined in claim 1 wherein said bar has the elongated aperture substantially symmetrically formed on a center of said bar.

References Cited
UNITED STATES PATENTS 3,247,873   4/1966   Aitkin et al. _____ 143—32

DONALD R. SCHRAN, *Primary Examiner.*